US005727217A

United States Patent [19]
Young

[11] Patent Number: 5,727,217
[45] Date of Patent: Mar. 10, 1998

[54] CIRCUIT AND METHOD FOR EMULATING THE FUNCTIONALITY OF AN ADVANCED PROGRAMMABLE INTERRUPT CONTROLLER

[75] Inventor: Bruce Young, Tigard, Oreg.

[73] Assignee: Intel Corporation, Santa Clara, Calif.

[21] Appl. No.: 576,511

[22] Filed: Dec. 20, 1995

[51] Int. Cl.[6] .................. G06F 9/46; G06F 9/455
[52] U.S. Cl. ........................... 395/733; 395/500
[58] Field of Search ..................... 395/733–740, 395/500

[56] References Cited

U.S. PATENT DOCUMENTS

| | | | |
|---|---|---|---|
| 4,365,294 | 12/1982 | Stokken | 395/557 |
| 4,891,773 | 1/1990 | Ooe et al. | 364/578 |
| 5,129,064 | 7/1992 | Fogg, Jr. et al. | 395/500 |
| 5,237,692 | 8/1993 | Raasch et al. | 395/740 |
| 5,579,512 | 11/1996 | Goodrum et al. | 395/500 |
| 5,590,312 | 12/1996 | Marisetty | 395/500 |
| 5,623,674 | 4/1997 | Pedrizetti | 395/733 |
| 5,630,052 | 5/1997 | Shah | 395/183.14 |

Primary Examiner—Gopal C. Ray
Attorney, Agent, or Firm—Blakely, Sokoloff, Taylor & Zafman

[57] ABSTRACT

An Advanced Programmable Interrupt Controller ("APIC") unit utilizing an emulation processor to emulate the operations of a conventional hardware-based APIC. Emulation software executed by the emulation processor handles actual interrupt handling and allows the APIC unit to support any number of interrupt inputs within the bounds of APIC architecture. The APIC unit further comprises actual APIC bus interface circuitry coupling the APIC unit to an APIC bus and redirection tables stored in local memory on-board the emulation processor or external.

39 Claims, 9 Drawing Sheets

CIRCUIT AND METHOD FOR EMULATING THE FUNCTIONALITY OF AN ADVANCED PROGRAMMABLE INTERRUPT CONTROLLER

BACKGROUND OF THE INVENTION

1. Field of the Invention

The present invention relates to the field of electronic circuitry controlling interrupts. More particularly, this invention relates to a circuit and method which emulates the operations of an Advanced Programmable Interrupt Controller.

2. Description of Art Related to the Invention

Fundamental to the performance of any computer system, a processor performs a number of operations including controlling various intermittent "services" requested by peripheral devices coupled to the computer system. These services may include data transmission, data capture or any other data manipulative operations essential to the functionality of the peripheral devices. Employed in many multi-processor computer systems, an Advanced Programmable Interrupt Controller ("APIC") interrupt delivery mechanism typically is used to detect an interrupt request from one of its peripheral devices and to advise one or more processors that a particular service corresponding to the interrupt request needs to be performed.

For a multi-processor environment, the APIC interrupt delivery mechanism 10 comprises at least one input/output ("I/O") APIC 20, a plurality of Local APICs 30a–30n and a dedicated APIC bus 40 coupling the I/O APIC 20 to the Local APICs 30a–30n as shown in FIG. 1. Situated in an assigned I/O subsystem 50, the I/O APIC 20 is configured to receive interrupt requests from peripheral devices (not shown) of that I/O subsystem 50 and possibly other I/O subsystems. Upon detecting an interrupt request, the I/O APIC 20 transmits an APIC interrupt message which includes an interrupt vector providing information about the interrupt (e.g., its priority) through the APIC bus 40 with one or more Local APICs 30a–30n as its destination. Each of the plurality of Local APICs 30a–30n, residing in a corresponding processor 60a–60n, is configured to determine whether or not its processor core should accept the APIC interrupt message broadcasted over the APIC bus 40. The Local APICs 30a–30n handle all interactions between the I/O APIC 20 and their processor core according to a well-known protocol featuring Interrupt Request ("INTR"), Interrupt Acknowledge ("INTA") and End Of Interrupt ("EOI") bus operations.

While APIC interrupt delivery mechanism 10 provides a number of advantages, its overall construction poses a few disadvantages. One disadvantage is that conventional APICs are hardware intensive in design thereby requiring a large number of gates (i.e., a high gate count). It is well known that devices with high gate counts are more difficult to implement and are more costly to produce. A second disadvantage is that this hardware intensive design of the conventional APIC reduces its flexibility because it cannot be easily modified to support a wide range of interrupts as required by different types of computer systems.

Therefore, it would be advantageous to create an APIC Unit which emulates the operations of a conventional APIC by providing a minimal amount of hardware, primarily within an APIC Bus Interface Unit of the APIC Unit, and controlling the hardware with firmware to support a wide range of interrupt requests.

SUMMARY OF THE INVENTION

The present invention relates to an advanced programmable interrupt controller ("APIC") unit comprising at least an emulation processor and an APIC bus interface unit coupled together by a local bus. The emulation processor receives an interrupt request directly or indirectly from a peripheral device and executes emulation software to control the servicing of that interrupt request. The APIC bus interface unit provides the hardware needed to interface the APIC unit to an APIC bus.

BRIEF DESCRIPTION OF THE DRAWINGS

The features and advantages of the present invention will become apparent from the following detailed description of the present invention in which.

DETAILED DESCRIPTION OF THE INVENTION

A method and circuit operating in conjunction with software to emulate the operations of an APIC employed in a computer system is described below in detail. For clarity sake, the present invention ("APIC Unit") shall be directed to the modification of an I/O APIC although a similar configuration could be adopted by the Local APIC. In the following description, in order to provide a thorough understanding of the present invention, specific details are set forth such as the bit representation of certain storage elements implemented within the APIC Unit. However, it will be apparent to one skilled in the art that the present invention may be practiced without these specific details. In other instances, certain well-known components and operations are not shown in order to avoid obscuring the present invention.

In the following description, a number of terms are frequently used to describe various components as well as their characteristics and binary representations. With respect to the term "storage element", it should be liberally construed as any component capable of storing information including, but not limited to registers, volatile or non-volatile memory and the like. Moreover, these storage elements have a binary representation defined by "bit fields" which are defined as one or more bits in sequence. Each bit exists in one of two states; namely, a "set" (or "read") state normally when the bit is asserted and a "clear" (or "write") state when the bit is de-asserted.

Figure 2:
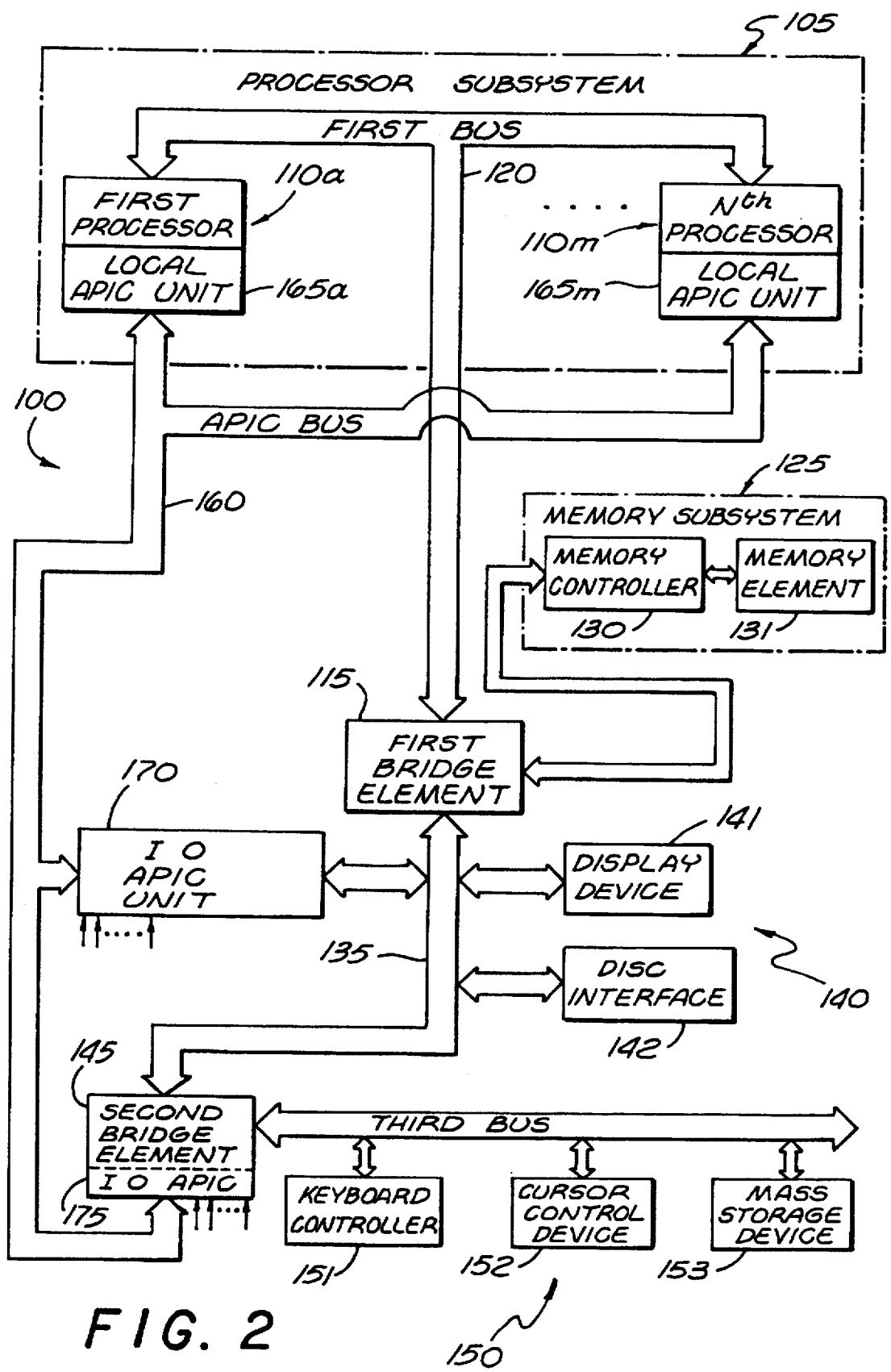
FIG. 2 is a block diagram of an illustrative embodiment of a system implementing an APIC Unit which emulates the operations of a conventional I/O APIC.

Referring to FIG. 2, a multi-processor computer system employing an "APIC Unit" is shown. The multi-processor computer system 100 comprises a processor subsystem 105, which includes a plurality of host processors 110a–110m and a first bridge element 115. Both the processor subsystem 105 and the first bridge element 115 are coupled to a first bus 120 including data, address and control lines. The first bridge element 115 is further coupled to the memory subsystem 125 which includes a memory controller 130 which controls access to at least one memory element 131. Preferably, the memory element 131 is dynamic random access memory ("DRAM"), but may be substituted for read only memory ("ROM"), video random access memory ("VRAM") and the like. The memory element 131 stores information and instructions for use by the host processors 110a–110m.

The first bridge element 115 operates as an interface between the first bus 120 and a second bus 135 such as a Peripheral Component Interconnect ("PCI") bus. Thus, the first bridge element 115 provides a communication path (i.e., gateway) allowing a first group of peripherals 140 to access information from or transfer information to the memory subsystem 125 and/or the processor subsystem 105. In this embodiment, the first group of peripheral devices 140 includes, but is not limited to a display monitor 141 (e.g., cathode ray tube, liquid crystal display, flat panel display, etc.) for displaying images, a hard disc interface 142 and the APIC Unit 170.

The second bus 135 may be further coupled to a second bridge element 145 which provides an interface between the first group of peripherals 140 and a second group of peripherals 150 coupled to a third bus 155 (e.g., an ISA bus). This second group of peripheral devices 150 includes, but is not limited to a keyboard controller 151 for controlling operations of an alphanumeric keyboard, a cursor control device 152 (e.g., a mouse, track ball, touch pad, joystick, etc.) as well as a mass storage device 153 (e.g., magnetic tapes, hard disk drive, floppy disk drive, etc.). It is contemplated that the computer system 100 may be configured differently or employ some or different components than those illustrated.

In order to control the operations of at least these first and second groups of peripheral devices, a dedicated APIC bus 160, including a pair of data lines and a clock line, is coupled to at least Local APICs 165a–165m (each assigned to one of the host processors 110a–110m), the APIC Unit 170 as well as possibly a conventional I/O APIC 175. The APIC Unit 170 may support interrupt requests from peripheral devices which are coupled to the second bus 135 or other buses employed within the computer system 100. The APIC Unit 170 transmits and receives APIC messages over the APIC bus 160 to and from the Local APICs 165a–165m.

Figure 1:
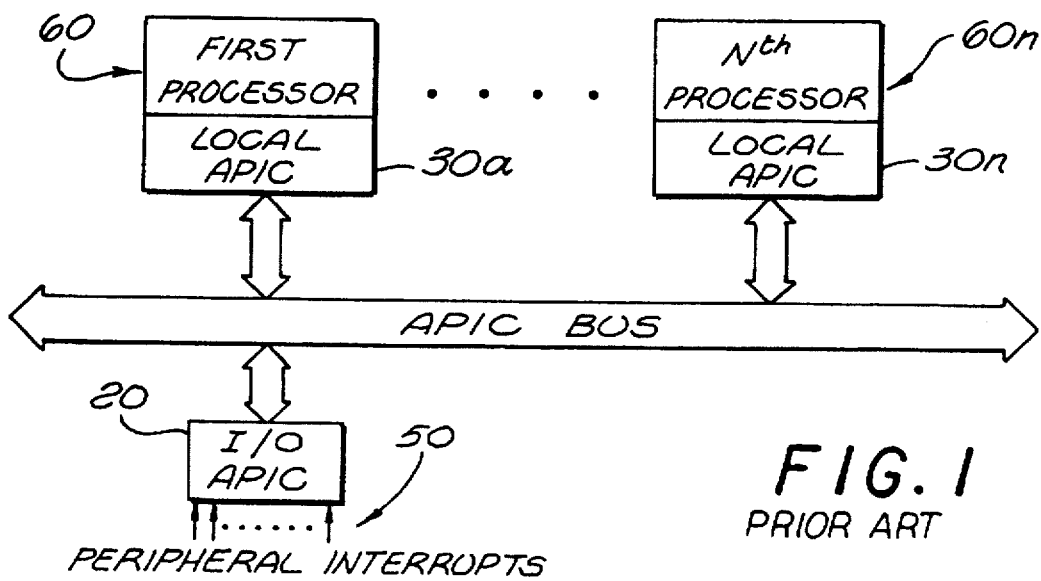
FIG. 1 is a block diagram illustrating the conventional APIC architecture employed within a computer system.
Figure 3A:
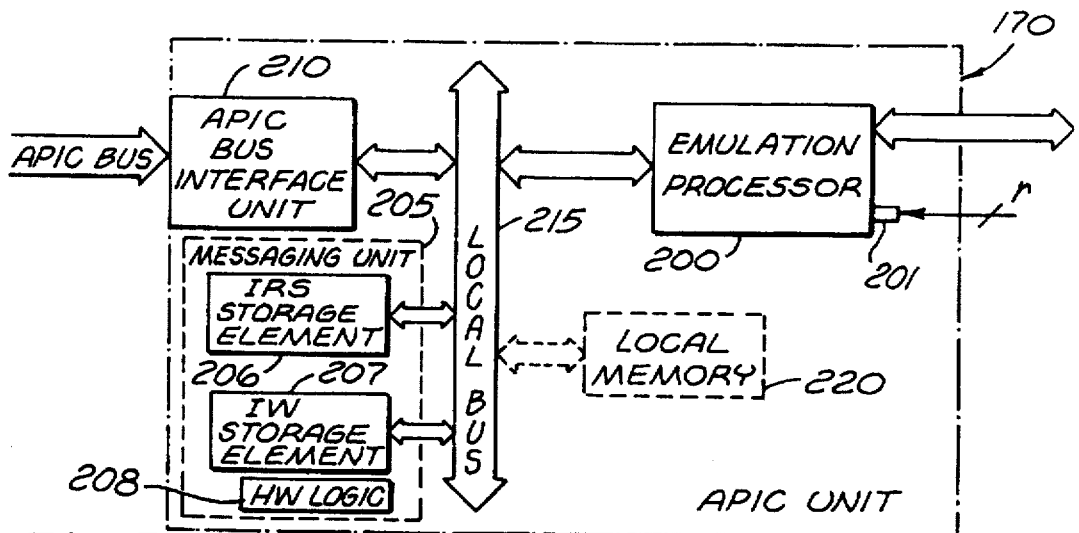
FIG. 3a is a block diagram of an illustrative embodiment of the APIC Unit of FIG. 2.
Figure 3B:
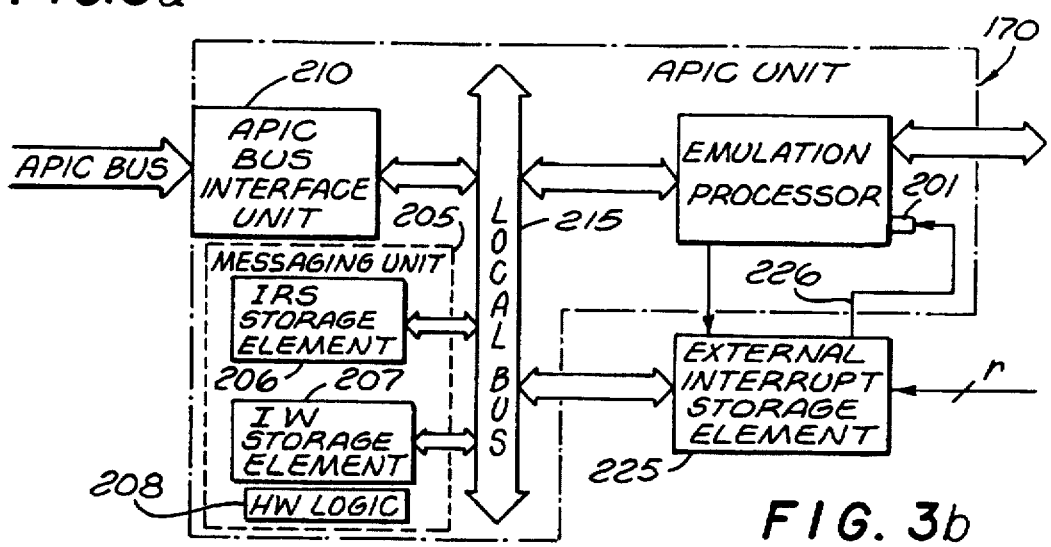
FIG. 3b is a block diagram of another illustrative embodiment of the APIC Unit of FIG. 2 wherein an external interrupt controller is utilized to support a large number of interrupt requests.

Referring now to FIGS. 3a and 3b, illustrative embodiments of the APIC Unit of FIG. 2 are shown. In both of these embodiments, the APIC Unit 170 comprises at least (i) an emulation processor 200 which executes emulation software to control the overall operations of the APIC Unit 170, (ii) a messaging unit 205 including a plurality of storage elements accessible to both the emulation processor 200 and the host processor(s) and (iii) an APIC Bus Interface Unit 210. All of these components 200, 205 and 210 are coupled together via a local bus 215.

In FIG. 3a, the emulation processor 200, namely its interrupt controller (not shown), receives "r" interrupt requests from peripheral devices through its interrupt control pins 201 ("r" is an arbitrary whole number greater than "0") and determines whether APIC interrupt messages should be sent to the host processor(s) via the APIC bus 160. To determine whether or not an APIC interrupt message should be sent, the emulation processor 200 accesses an entry of a Redirection Table corresponding to the selected interrupt request and checks the contents of the entry to uncover if the interrupt is masked. The Redirection Table may be stored internally in on-board memory (not shown) or alternatively in local memory element 220 as shown with dashed-lines. If the APIC interrupt message needs to be broadcasted to one or more of the host processors, the emulation processor 200 writes the contents of the entry to the APIC Bus Interface Unit 210 (discussed below) prompting it to send the APIC interrupt message over the APIC bus 160.

In FIG. 3b, it is contemplated that the APIC Unit 170 may utilize an external interrupt storage element 225 which may be configured external to the APIC unit 170 to receive the interrupt requests and to transfer an encoded interrupt control signal via line 226 into the interrupt control pins 201 of the emulation processor 200. The external interrupt storage element 225 may be required when the emulation processor 200 does not have a sufficient number of interrupt control pins 201 to handle all of the interrupts in need of support by the APIC Unit 170. The encoded interrupt control signal indicates which peripheral devices have requested interrupt servicing. For example, for an i960®RP™ processor being manufactured by Intel Corporation of Santa Clara, Calif., it is designed with up to four (4) interrupt control pins thereby requiring the external interrupt storage element 225 if more than four interrupts are required.

To insure that interrupts which are disabled by the mask bit in their Redirection Table entry (discussed below) do not cause the emulation processor to spend all of its time jumping in and out of interrupt service routines, the external interrupt storage element 225 includes an independent mask bit for each interrupt input. When the mask bit is set in the Redirection Table, the firmware will also set the corresponding mask bit in the external interrupt storage element 225 so that no interrupt for the emulation processor 220 will be generated when the interrupt input is active. The current state of the interrupt input should still be visible when the storage element 225 is read but no interrupt to the emulation processor 220 should be generated if the mask bit is set. This same mask bit should be set for all interrupts with their Redirection Table mask bit set as well.

Figure 4A:
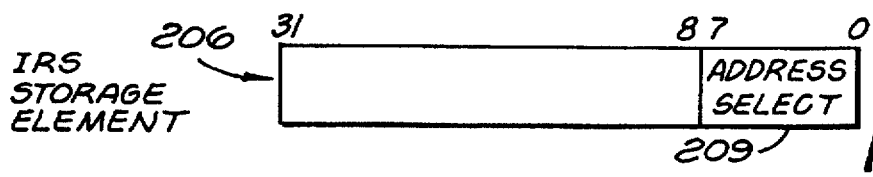
FIGS. 4a and 4b are bit representations of an I/O Register Select storage element and an I/O Window storage element, respectively.
Figure 4B:

Referring to both FIGS. 3a–3b, the messaging unit 205 include an I/O Register Select ("IRS") storage element 206, I/O Window ("IW") storage element 207 and hardware ("HW") logic 208 to control whether the host processor(s) have access to these storage elements 206 and 207. The preferred bit representations of the IRS and IW storage elements are illustrated in FIGS. 4a–4b, although any bit representations may be chosen. As shown in FIG. 4a, the IRS storage element 206 is a 32-bit read/write register in which the least significant 8 bits are reserved for an address select bit field 209. The address select bit field 209 is used to indicate through an indirect addressing scheme from which logical storage locations one or more host processors are able to read information from or write information therein. Table 1 illustrates that these storage locations may include an APIC Identification storage element, an APIC Arbitration storage element, an APIC Version storage element or an entry of the Redirection Table.

TABLE 1

Address Select Bit Field

| Address Select Value (hex) | Name of Storage Element | Host Software Access |
|---|---|---|
| 00 | APIC Identification Storage Element | Read/Write |
| 01 | APIC Version Storage Element | Read-Only except bit 8. Bit 8 Read/Write. |
| 02 | APIC Arbitration Storage Element | Read only |
| 10 | Redirection Table Entry 0 (Bits 31–0) | Read/Write |
| 11 | Redirection Table Entry 0 (Bits 63–32) | Read/Write |
| 12 | Redirection Table Entry 1 (Bits 31–0) | Read/Write |
| 13 | Redirection table Entry 1 (Bits 63–32) | Read/Write |
| 14 through FF | Redirection Table Entry 2 through 120. | Read/Write |

Once the IRS storage element 206 has been written, an interlock signal is asserted by the hardware logic 208 within the messaging unit 205 to preclude the contents of the IRS storage element 206 from being overwritten before (i) the emulation processor obtains data from the storage element identified by the address select bit field 209 and places the data in the IW storage element 207 of FIG. 4b to be read by the host processor(s), or (ii) the emulation processor writes the data input into the IW storage element 207 from the host processor(s) into the storage elements identified by the address select bit field 209. The emulation processor also must keep the value of the IW storage element 207 updated if the Redirection Table is modified due to interrupt activity.

Referring back to FIGS. 3a and 3b, the APIC Bus Interface Unit 210 is dedicated hardware which acts as a standard interface between the local bus 215 and the APIC bus 160 in order to exchange messages with the Local APIC via the APIC bus 160. The APIC Bus Interface Unit 210 includes the standard interface to establish communications with the APIC bus 160 as in conventional APIC architectures as well as a plurality of storage elements (e.g., typically registers mapped to the address space of the local bus 215) to control the operations of the APIC Bus Interface Unit 210. These plurality of storage elements include the APIC Identification storage element, the APIC Arbitration storage element, an EOI Vector storage element, an APIC Control/Status storage element, an Interrupt Message storage element and perhaps the APIC Version storage element, all of which are described in detail with respect to FIGS. 5a–5f.

Figure 5A:
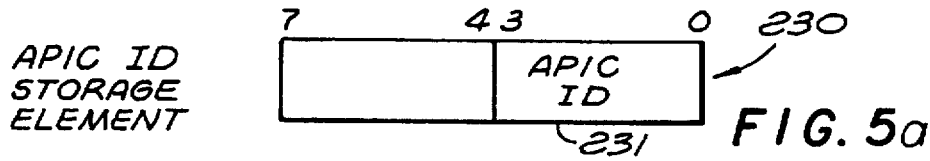
FIGS. 5a–5f are bit representations of a plurality of storage elements which may be implemented within the APIC Bus Interface Unit; namely, an APIC Identification storage element, APIC Arbitration storage element, an EOI Vector storage element, an APIC Control/Status storage element, an Interrupt Message storage element and an APIC Version storage element, respectively.

Referring now to FIG. 5a, the APIC Identification storage element 230 is illustrated as an 8-bit register that can be accessed by any of the plurality of processors of the computer system. This storage element 230 is configured to contain an identification number of the APIC Unit, referred to herein as the "APIC ID" 231, which serves as the physical name of the APIC Unit. The APIC ID 231 is unique for each of the APIC Units. In this embodiment, the APIC ID 231 is represented as a 4-bit value although any number of bits may be used depending on the configuration of the APIC bus and the number of APIC Units employed within the computer system.

Figure 5B:
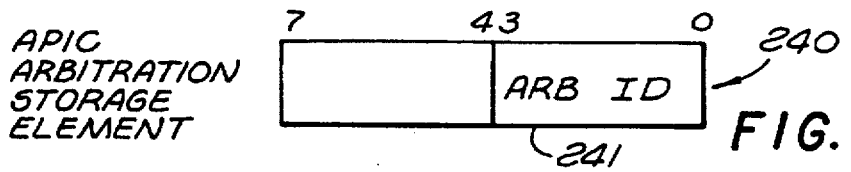

Referring to FIG. 5b, the APIC Arbitration storage element 240 is illustrated as an 8-bit register that can be accessed by any of the plurality of processors of the computer system. This storage element 240 contains a current APIC bus arbitration priority ("ARBID") 241 for its APIC Unit. Operating under a rotating priority scheme (e.g., "Round-Robin arbitration"), the APIC Unit increments its ARBID 241 after ownership of the APIC bus is granted to another APIC or APIC Unit or loads its ARBID 241 to the lowest priority value after receiving ownership of the APIC bus. Typically, the APIC Arbitration storage element 240 is loaded with a valid ARBID, namely the APIC ID whenever the APIC Identification storage element 230 is loaded and its APIC Unit is coupled to the APIC bus. In this embodiment, the ARBID 241 is 4-bits to accommodate sixteen (16) priority levels although up to 256 priority levels are available due to its preferred 8-bit size.

Figure 5C:

Referring now to FIG. 5c, the EOI Vector ("EOIV") storage element 250 is illustrated as an 8-bit register which provides temporary storage of the interrupt vector of an EOI message for use by the emulation processor. When an EOI message is received from the APIC bus, the APIC Bus Interface Unit transfers the contents of the interrupt vector from the EOI message into the EOIV storage element 250. To ensure that the contents of the interrupt vector are valid, an EOI Flow Control bit of the APIC Control/Status storage element (see FIG. 5d) should be set and the EOI Received bit of the APIC Control/Status storage element should indicate that the EOI message has been received. If the EOI Flow Control bit is not set, another EOI message could have been received just as the EOIV storage element 250 is being read resulting in corrupt read data.

Figure 5D:
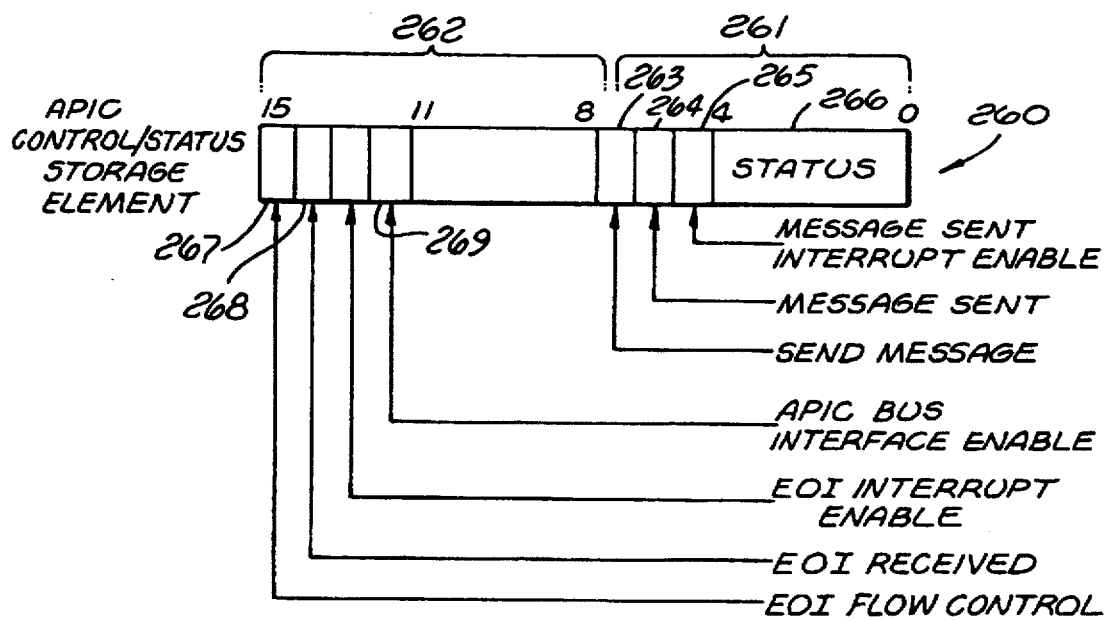

As shown in FIG. 5d, the APIC Control/Status storage element 260 is illustrated as a 16-bit register that can be collectively accessed as either a single 16-bit word or a pair of 8-bit bytes. This storage element 260 is used to control and monitor the status of the APIC Bus Interface Unit. A first bit field 261 is used to control the transmission of APIC interrupt messages while a second bit field 262 is used to control the reception of EOI messages from the Local APIC(s). The first and second bit fields 261 and 262 are defined by the least significant byte ("AC[7:0]") and the most significant byte ("AC[15:8]"), respectively.

More specifically, the first bit field 261 includes at least a "Send Message" bit ("AC[7]") 263, a "Message Sent" bit ("AC[6]") 264, a "Message Sent Interrupt Enable" bit ("AC[5]") 265 and a APIC Message Status bit field ("AC[4:0]") 266. The Send Message bit 263 is used to signal the APIC Bus Interface Unit to transfer the contents of the Interrupt Message storage element (see FIG. 5e) into an APIC interrupt message being prepared by the APIC Bus Interface Unit. The APIC Bus Interface Unit will attempt to send the APIC interrupt message whenever this bit is set and the Message Sent bit 264 is cleared. The Message Sent bit 264 is used indicate when the APIC interrupt message has been sent. To ensure that it was received by a Local APIC, the APIC Message Status bit field 266 must be checked. The APIC Message Status bit field 266 contains data indicating whether the APIC interrupt message was successfully sent or if an error was encountered during sending. Finally, the Message Sent Interrupt Enable bit 265 is used to enable an interrupt to be generated from the emulation processor when the Message Sent 264 bit is set because the APIC Message status field 266 is available. When the Message Sent Interrupt Enable bit 265 is cleared, the APIC Bus Interface Unit will not interrupt the emulation processor after the APIC interrupt message has been sent.

The second bit field 262 includes at least the EOI Flow Control Bit ("AC[15]") 267, an EOI Received bit ("AC

[14]") 268 and an EOI Interrupt Enable bit field ("AC[13]") 269. The EOI Flow Control bit 267 is used to determine whether or not to accept an EOI message from the APIC bus. When AC[15] 269 is cleared, the APIC Bus Interface Unit will always accept an EOI message. When AC[15] 267 is set, the APIC Bus Interface Unit will wait for the emulation processor to process a previous EOI message before accepting another EOI message. The EOI Received bit 268 is used to indicate that an EOI message has been received. After receiving the EOI message, the emulation processor clears AC[14] 268. Finally, the EOI Interrupt Enable bit 269 is used to enable an interrupt from the emulation processor to be generated when AC[14] 268 is cleared (logic "1" in this case). When this bit is cleared, an EOI message will not interrupt the emulation processor.

Figure 5E:
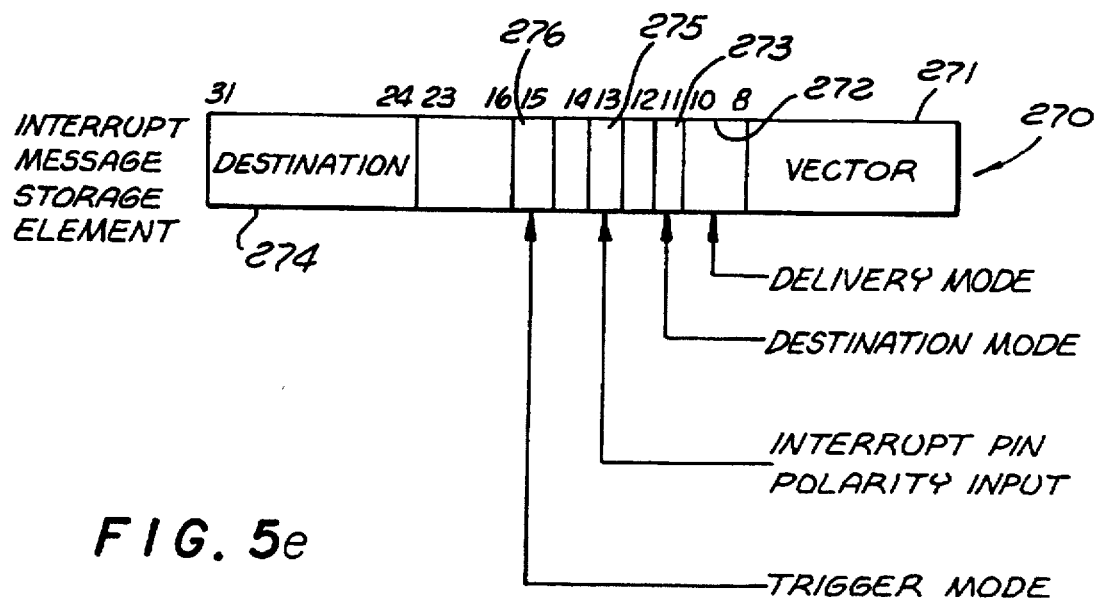

Referring to FIG. 5e, the Interrupt Message ("IM") storage element 270 is illustrated as a 32-bit register which is used to provide data placed into the APIC interrupt message. The fields of the IM storage element 270 correspond to the fields defining each entry of the Redirection Table (discussed below). It is generally considered that the IM storage element 270 should not be written into unless the APIC Control/Status storage element 260 of FIG. 5d indicates that the APIC Unit is not in the process of sending an APIC interrupt message (i.e., AC[7] is cleared). If the emulation processor aborts an APIC interrupt message by clearing the Send Message bit 263 before the Message Sent bit 264 is set, the emulation processor should wait for at least 30 APIC clocks (1.8 µs at 16 MHz) before attempting to write a new value to the IM storage element 270.

The IM storage element 270 is at least separated into six (6) bit fields; namely, a "Vector" bit field 271, a "Delivery Mode" bit field 272, a "Destination Mode" bit field 273, an "Interrupt Input Pin Polarity Mode" bit field 274, a "Trigger Mode" bit field 275 and a "Destination" bit field 276. The Vector bit field 271, defined by the least significant byte "IM[7:0]" of the IM storage element 270, contains the interrupt vector associated with a particular interrupt.

The Delivery Mode, Destination Mode and Destination bit fields 272–274 describe the type of interrupt message and its type of delivery. It is contemplated that any APIC bus protocol may be used. In this embodiment, the Deliver Mode bit field 272 ("IM[10:8]") specifies how the Local or I/O APIC (or APIC unit) listed in the Destination bit field 274 should act upon receiving an interrupt signal. Certain types of these modes include fixed priority, lowest priority, system management interrupt ("SMS"), non-maskable interrupts ("NMI") and the like. The Destination Mode bit field 273 ("IM[11]"), which is assigned to each APIC Unit, is used to determine how the bits associated with the Destination bit field 274 are interpreted. The Destination bit field 274 is represented by the most significant byte of the IM storage element ("IM[31:24]"). Depending on the chosen Destination Mode, certain bits of the IM storage element 270 are configured to contain the APIC ID of the destination processor(s).

The Interrupt Input Pin Polarity bit mode 275 ("IM[13]") specifies the polarity of each interrupt signal connected to the interrupt control pins of APIC Unit. A value of logic "0" means the interrupt requests are presumed to be active-high and a value of logic "1" means the interrupt requests are presumed to be active-low.

The Trigger Mode bit field 276 ("IM[15]") indicates the type of signal transmitted to the interrupt control pins of the emulation processor that triggers an interrupt. A value of logic "0" means the input is edge sensitive and a value of logic "1" means the input is level sensitive. This information along with the Interrupt Pin Polarity 275 is important so that the Emulation Processor or the External Interrupt storage element 225 can be set up to recognize a Valid Interrupt Signal.

Figure 5F:
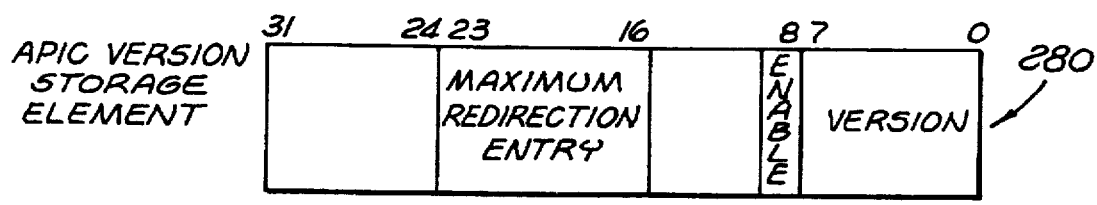

In the embodiment, the APIC Bus Interface Unit further may include the APIC Version storage element 280 has shown in FIG. 5f although it is contemplated that functionality of the APIC Version storage element may be performed by local software or external to the APIC Unit. The APIC Version storage element 280 provides information to the emulation software about the particular type of APIC Unit implemented and other necessary control information. For example, the APIC Version Storage element 280 may be configured to contain information pertaining to (i) the particular type of implementations of the APIC Unit ("VC[7:0]"), (ii) the number of entries supported by the Redirection Table ("VC[23:16]"), (iii) whether the APIC Unit is enabled ("VC[8]") and the like. The emulation software running on the emulation processor is coded to utilize this information.

Figure 6:
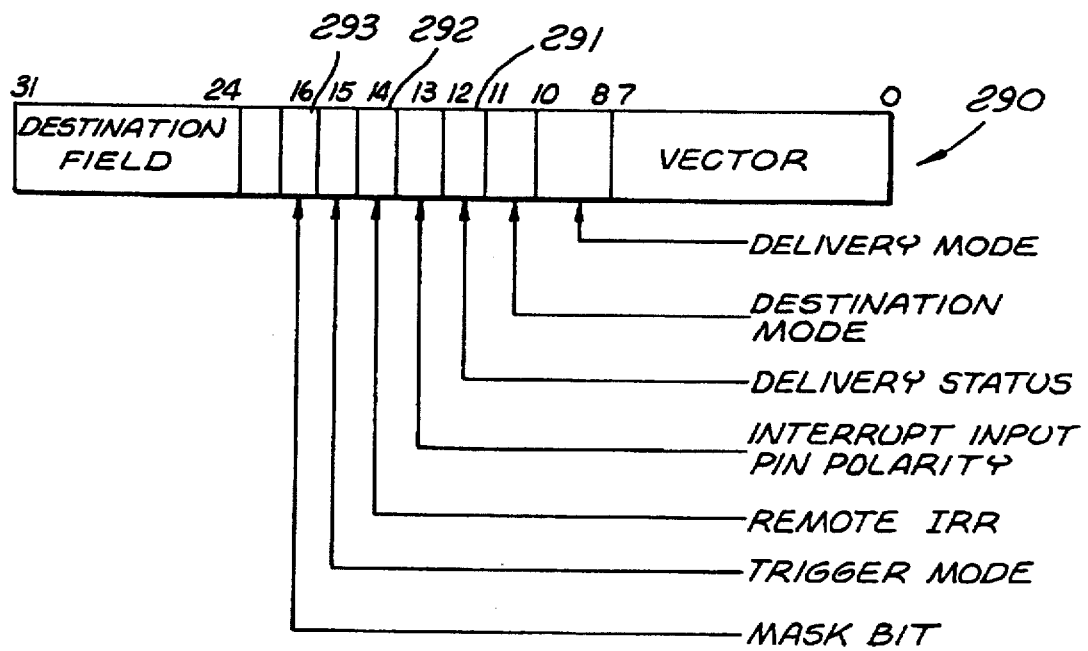
FIG. 6 is a bit representation of an entry of the Redirection Table.

Referring now to FIG. 6, the Redirection Table is implemented as a data structure in local memory (on-board or external) having at least one entry assigned for each interrupt control pin. Each entry 290 of the Redirection Table is 32-bits in length of which the format of its least significant word is similar to the least significant word of the IM storage element of FIG. 5e, excluding bits 12, 14 and 16. Likewise, the most significant byte of the IM storage element (i.e., the Destination bit field) of FIG. 5e is identical to the most significant byte of the entry pair.

More particularly, bit 12 ("RT[12]") 291 represents the delivery status of a particular interrupt. RT[12] 291 is cleared if there is currently no activity for this interrupt while RT[12] 291 is set to indicate that the interrupt has been requested but its delivery to one or more of the processors has been delayed due to traffic conditions on the APIC bus. Additionally, bit 14 ("RT[14]") 292 represents the interrupt request received ("LRR") which is used to indicate if the Local APIC(s) have accepted an APIC interrupt message sent by the APIC Unit. RT[14] 292 is set by the emulation software running in the emulation processor after at least one the Local APICs has accepted the APIC interrupt message and is cleared when an EOI message is received from a Local APIC. Bit 16 ("RT[16]") 293 is a Mask bit which, when set at power-up, indicates that receipt of an interrupt request associated with this entry is to be ignored. Otherwise, the APIC Unit is to perform its proper interrupt operations whenever an unmasked interrupt is received.

Figure 7A:
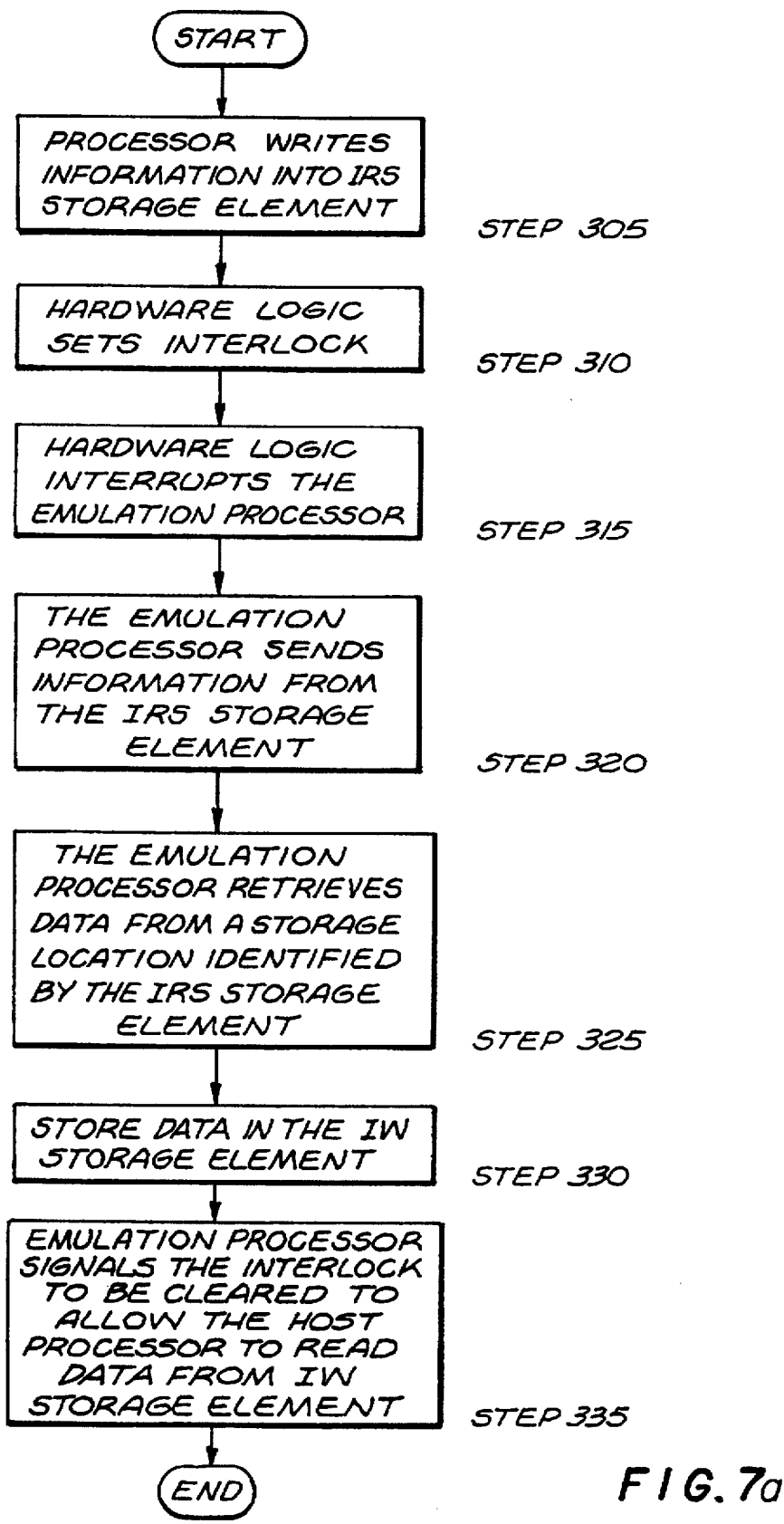
FIGS. 7a and 7b are flowcharts illustrating the read and write operations of the APIC Unit under control of interrupt service routine software executed by the emulation processor.
Figure 7B:
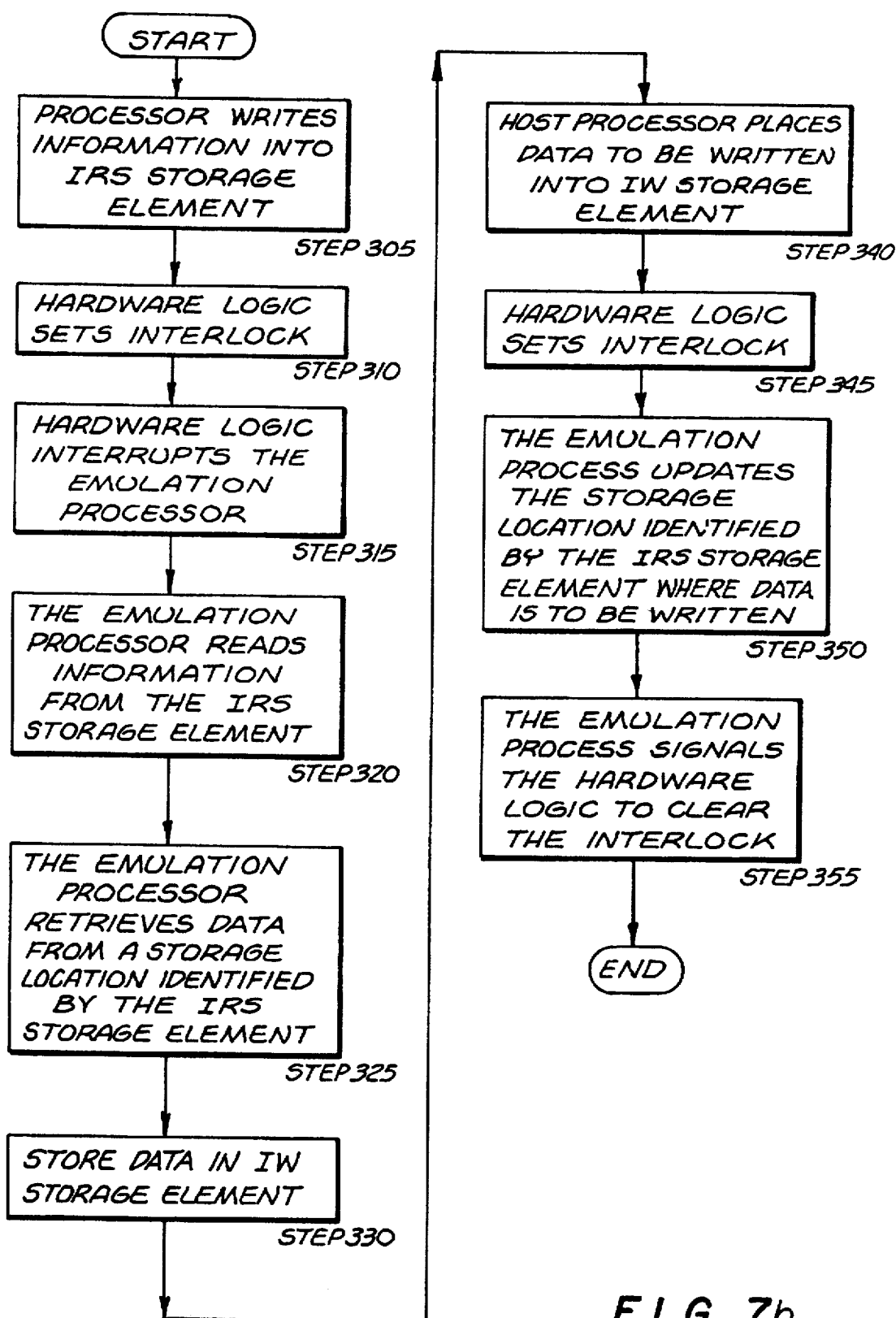
Figure 8A:
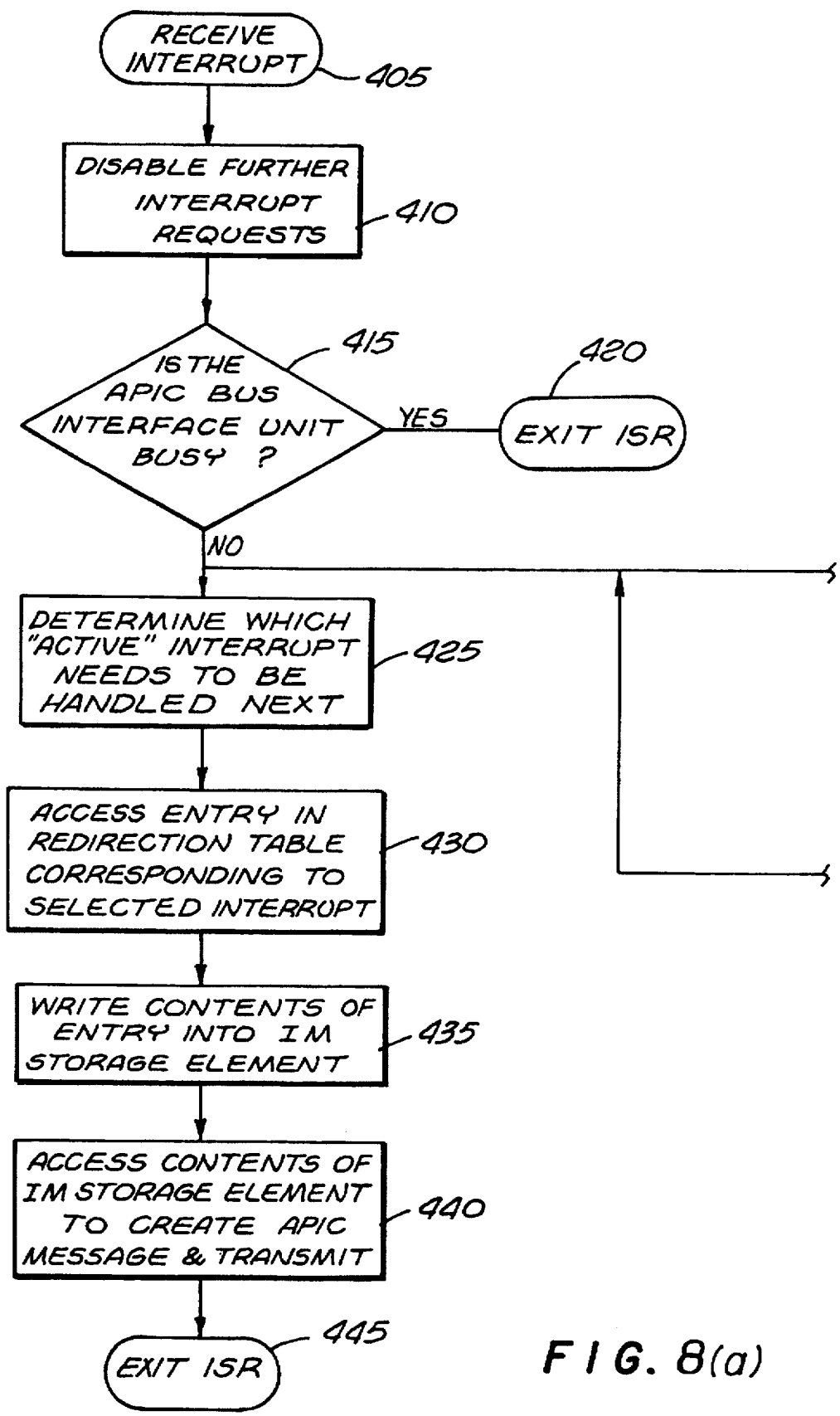
FIGS. 8(a), 8(b) and 8(c) are a flowchart illustrating the control operations performed by the APIC Unit under control of interrupt service routine software executed by the emulation processor.
Figure 8B:
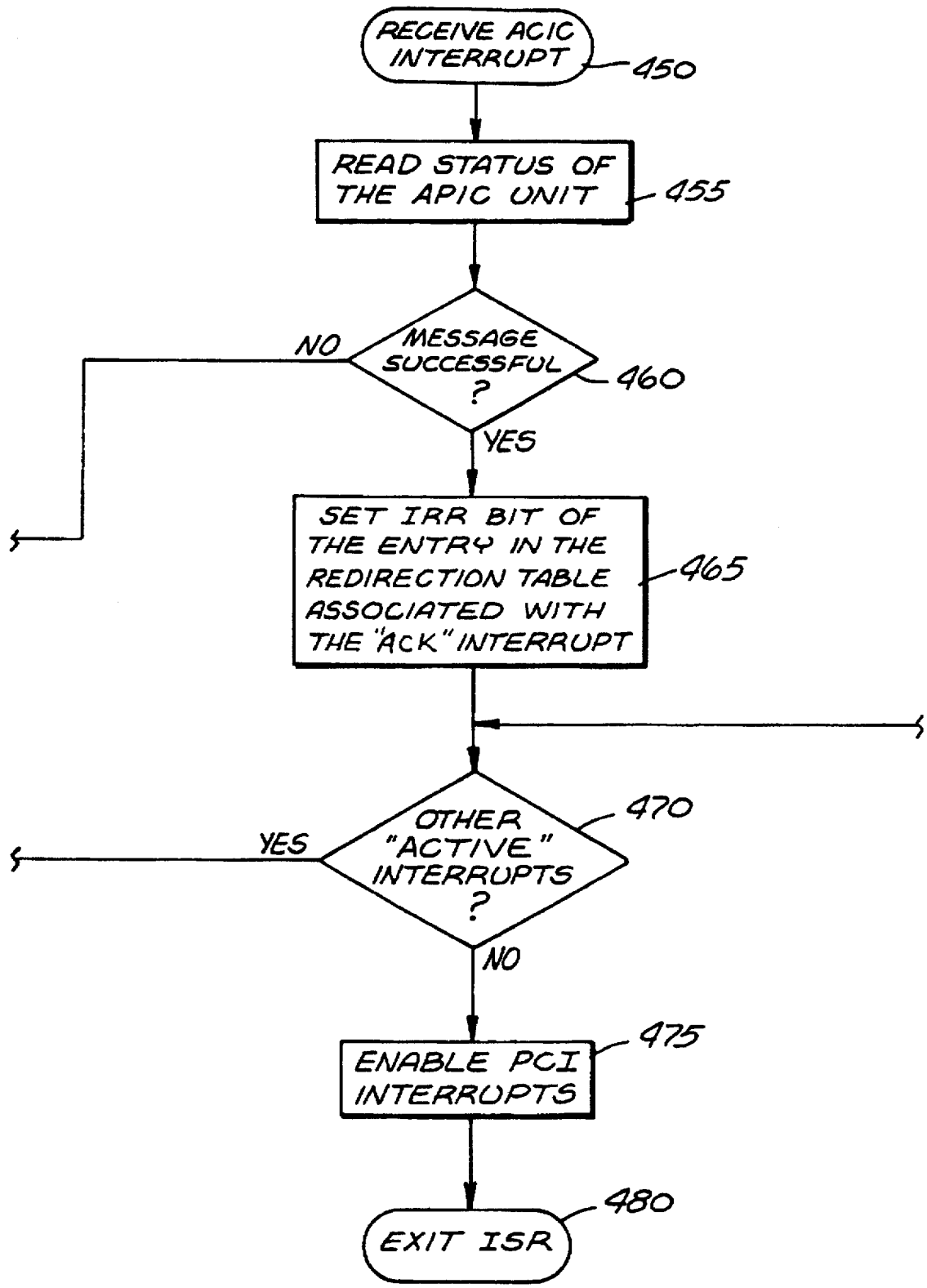
Figure 8C:
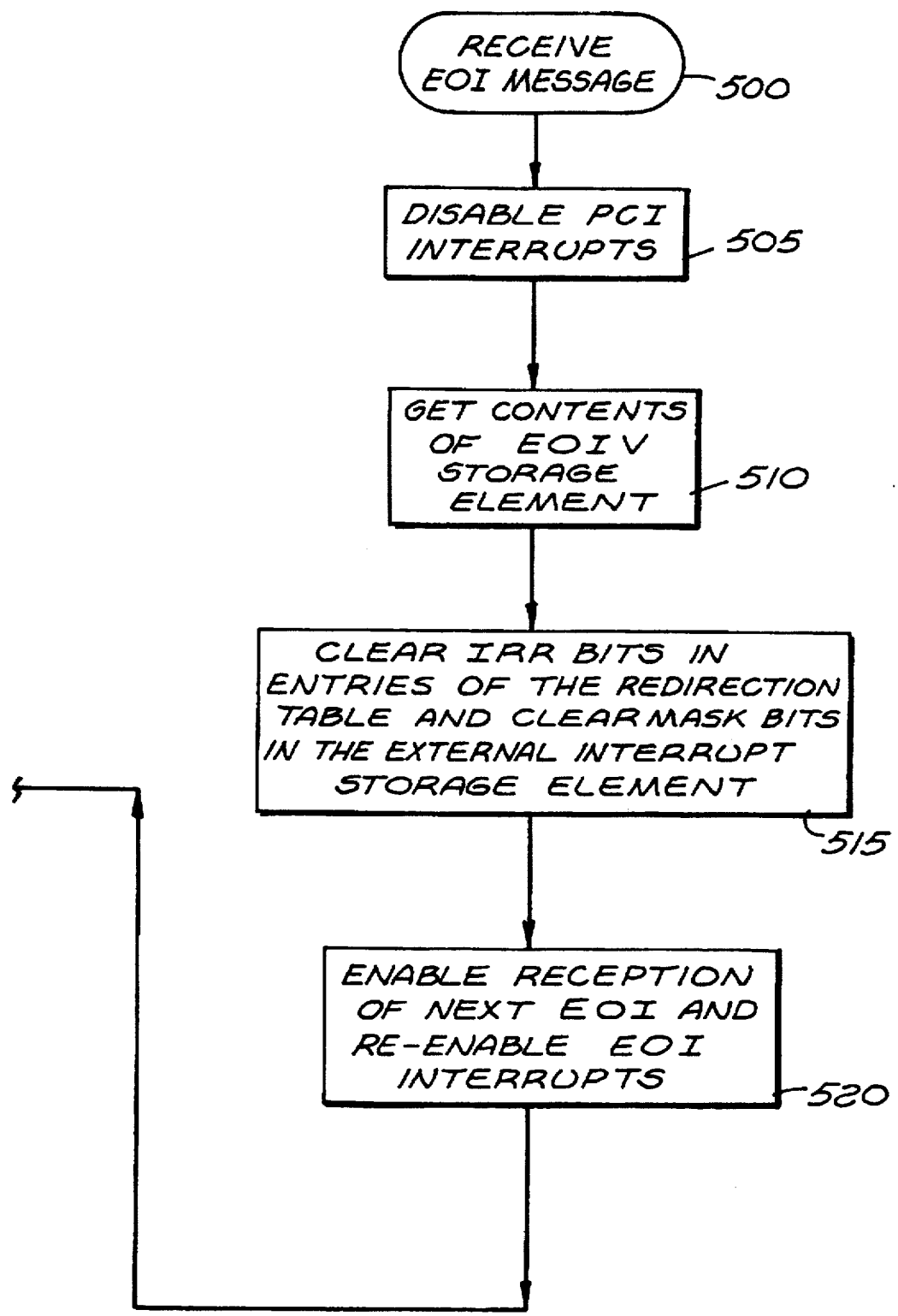

While FIGS. 2–6 illustrate the physical hardware architecture utilized by the APIC Unit, FIGS. 7–8 illustrate operations performed by the emulation processor executing emulation software and utilizing the physical hardware architecture described above. These operations include performing initialization tasks, actual input/output ("I/O") tasks and interrupt handling services. This emulation software featuring one or more Interrupt Service Routines ("ISRs") is loaded into the emulation processor from an external flash memory (e.g., EPROM) coupled to the local or PCI bus, from local memory previously set up by the host processor or from memory internal to the emulation processor by the host processor.

When the emulation processor is powered-up and the emulation software is being executed, a number of initialization tasks must be performed to synchronize the APIC Unit with other APICs employed in the computer system. This is performed before the APIC Unit is allowed to attempt to send an APIC interrupt message on the APIC bus to properly initialize the distributed arbitration algorithm. One task is that the physical hardware must be initialized. In this embodiment, the IRS, IW, APIC Identification, APIC Arbitration, EOIV, APIC Control/Status and the IM storage elements are initialized to 0H while the APIC Version storage element is initialized to F00H. Besides initializing the physical hardware, the data structures (i.e., the entries of the Redirection Table) need to be created. These data structures are initialized to 8000H in order to set the Mask bit of each entry of the Redirection Table to disable its corresponding interrupt until the emulation processor is ready to handle them.

As previously mentioned, with respect to I/O operations, host software interacts with the APIC Unit by reading information from and writing information into the IRS and IW storage elements. As shown in FIG. 7a, the host processor obtains data from the APIC Unit through a "read" operation as shown. In Step 300, the host processor writes information into the IRS storage element. This information includes an address of the storage location which contains the desired data. The address is input into the address select bit field of the IRS storage element. Next, in Step 305, the hardware logic in the APIC Unit sets an interlock to preclude the host processor from overwriting the contents of the IRS storage element or accessing the contents of the IW storage element. The interlock is visible to the host processor only as an increased latency to accesses of the IRS or IW storage elements. Thereafter, the hardware logic interrupts the emulation processor indicating that the IRS storage element contains valid information (Step 310). The emulation processor reads the IRS storage element and retrieves the data stored at the storage location identified by the address select bit field of the IRS storage element (Steps 315 and 320). The retrieved data is stored in the IW storage element (Step 325). After the data has been stored in the IW storage element, the Emulation Processor clears the interlock thereby allowing the host processor to read the contents of the IW storage element and continue its operations (Step 335). The interlock is cleared by clearing the appropriate storage element interrupt and re-enabling that interrupt.

Referring now to FIG. 7b, the write operation is quite similar to the read operation by the processor, hardware logic and the emulation processor performing the steps listed above in Steps 305-330. However, instead of reading the IW storage element, the host processor writes data into the IW storage element for subsequent storage into the storage location identified by the contents of the address select bit field (Step 340). After the host processor writes the data into the IW storage element, the interlock is set by the hardware logic to preclude the host processor from overwriting the contents of the IW storage element (Step 345). The data is read by the emulation processor to update the contents at the storage location i.e., the APIC ID storage element, APIC Arbitration storage element, the APIC Version storage element or a particular entry of the Redirection Table. (Step 350). Thereafter, the emulation processor signals the hardware logic to clear the interlock by clearing and re-enabling the APIC IW storage element interrupt (Step 355) in the messaging unit.

With respect to the interrupt handling, five (5) types of interrupts may be received by the emulation processor of which two types for messaging have been described above. The other three interrupts are related to APIC interrupt messages. For example, the third type is an interrupt from an external interrupt source (e.g., a peripheral device). Provided the interrupt is enabled, this interrupt will cause the APIC Unit to generate an APIC interrupt message to be transmitted through the APIC bus. On the other hand, an acknowledgment interrupt may be received by the APIC Bus Interface Unit when the APIC interrupt message has been sent, successfully or not, though the APIC bus. Likewise, an EOI interrupt may be received by the APIC Bus Interface Unit when an EOI message is sent by the Local APIC.

The operations performed by emulation software associated with the APIC unit in response to the three interrupts related to APIC Interrupt messages are shown in FIG. 8. This figure illustrates the system where all external interrupts are level sensitive. If edge sensitive interrupts must be supported, the external interrupt storage element should convert the active edge to a level by setting the interrupt into the emulation processor on the active edge and clearing it when the message has been successfully sent since no EOI message will be received for edge sensitive interrupts.

Once the APIC Unit receives an interrupt request from a peripheral device "PCI interrupts" (Step 405), the emulation software begins executing an interrupt service routine that disables further interrupt requests from other peripherals to the APIC Unit (Step 410). This is done so that the emulation software only looks at interrupts when it is able to handle them. Next, the emulation software checks to see if the APIC Bus Interface Unit is busy (Step 415). This is accomplished by reading the Send Message and Message Sent bits of the APIC Control/Status storage element as shown in Table 2 below.

TABLE 2

APIC Control/Status Send State Bits

| Send Message bit | Message Sent bit | APIC Bus Interface Unit State |
|---|---|---|
| 0 | X | APIC Unit idle |
| 1 | 0 | APIC Unit Attempting to Send Message |
| 1 | 1 | APIC Unit has sent message, Status is Valid |

If the APIC Bus Interface Unit is busy performing another operation, the interrupt service routine is exited to await receipt of the message sent interrupt (Step 420). If the APIC Bus Interface Unit is not busy, the emulation software determines which active interrupt needs to be handled (Step 425). An interrupt is deemed "active" if the external interrupt input is asserted and the Mask and IRR bits of its corresponding entry in the Redirection Table are cleared. The handling of the interrupts is accomplished by maintaining a pointer to the entry of the Redirection Table that was most recently sent as an APIC interrupt message through the APIC bus. The interrupts are examined in a round-robin fashion starting with the entry immediately following the last APIC interrupt message sent. Once the appropriate "active" interrupt is determined, the emulation software accesses an entry in the redirection table corresponding to that interrupt (Step 430). The contents of the entry is written by the emulation processor into the IM storage element of the APIC Bus Interface Unit (Step 435). Thereafter, the APIC Bus Interface Unit accesses the contents of the IM storage element in order to create an APIC interrupt message which is transmitted through the APIC bus (Step 440). The APIC interrupt message includes a request that the local APIC return an acknowledge interrupt upon receiving the APIC interrupt message. Thereafter, the emulation software exits the interrupt service routine (Step 445).

Upon the APIC Unit receiving the acknowledgment interrupt, the emulation software begins the interrupt service routine by reading the contents of the first bit field of the APIC control/status storage element and clearing the Message Sent bit (Steps 450 and 455). This enables the APIC Unit to transmit another APIC interrupt message. Thereafter, the emulation software determines whether the APIC interrupt message was "successful" (i.e., accepted by the local APIC without error) (Step 460). If the message is unsuccessful, the contents of the entry associated with the interrupt are not altered but rather the next active interrupt is determined leaving the prior interrupt in the queue to be handled at a later time (Step 460). Otherwise, if the message is successful, the IRR bit of the entry associated with the interrupt is set (Step 465). This is done in order to indicate that the interrupt message has been successfully sent to eliminate duplication.

Next, the emulation software determines whether there are any other active PCI interrupts that are still awaiting service (Step 470). This determination is accomplished by checking whether the IRR bit of the entry in the Redirection Table associated with the active interrupt is set and mask bit cleared. If so, the emulation software performs the above-described operations listed in Steps 430–445. Otherwise, the interrupts associated with the peripheral devices are enabled to allow the APIC Unit to receive more interrupts and the ISR is exited (Step 475–480). When a new interrupt is received, the process starting at Step 405 is repeated.

Upon receiving an EOI message from the host processor indicating that it is done servicing an interrupt (Step 500), the emulation processor begins execution of the ISR of the emulation software by first disabling the PCI interrupts (Step 505). Next, the contents of the EOIV storage element to obtain the EOI Vector for comparison as to which interrupt (s) has been serviced setting that interrupt to an "inactive" status (Step 510). Thereafter, all IRR bits for all redirection table entries as well as mask bits in the external interrupt storage element associated with interrupts having interrupt vectors matching the EOI Vector are cleared (Steps 515). Thereafter, the emulation software sets up the APIC Bus Interface Unit to receive another EOI message by re-enabling EOI interrupts (Step 520) by writing to the APIC Control/Status storage element. Next, the emulation software determines whether there are any more active PCI interrupts as outlined above in Step 470. If so, Steps 425–445 are repeated for the next PCI interrupt. Otherwise, as in Steps 475 and 480, the interrupts associated with the peripheral devices are enabled to allow the APIC Unit to receive more PCI interrupts.

The present invention described herein may be designed in many different embodiments evident to one skilled in the art than those described without departing from the spirit and scope of the present invention. The invention should, therefore be measured in terms of the claims which follow.

What is claimed is:

1. An advanced programmable interrupt controller (APIC) unit, capable of being coupled to a bus in order to handle interrupt servicing between at least one host processor and a plurality of peripheral devices, comprising:

a local bus;

an emulation processor coupled to said local bus, said emulation processor receives an interrupt request originating from a first peripheral device of the plurality of peripheral devices, and in response, generates an interrupt message;

an APIC bus interface unit coupled to said local bus, said APIC bus interface unit provides an interface between the local bus and the bus to allow the interrupt message produced by the emulation processor to be sent to the at least one host processor; and a memory element coupled to said local bus, said memory element containing a table having an entry associated with each of the plurality of peripheral devices capable of generating an interrupt request.

2. The APIC unit according to claim 1, wherein the memory element is a random access memory.

3. The APIC unit according to claim 2, further comprising a messaging unit coupled to said local bus, said messaging unit enables data to be read from or written into at least one entry of the memory element by a collective operation by the at least one host processor and said emulation processor.

4. The APIC unit according to claim 3, wherein said messaging unit includes at least a first storage element and a second storage element, said first storage element includes an address field indicating at least which of a plurality of entries is capable of providing data to or receiving data from the at least one host processor.

5. The APIC unit according to claim 4, wherein said messaging unit further includes logic circuitry to control access to said first and second storage element by the at least one host processor.

6. An advanced programmable interrupt controller (APIC) unit capable of being coupled to a bus in order to handle interrupt servicing between at least one host processor and a plurality of peripheral devices, comprising:

a local bus;

an emulation processor coupled to said local bus, said emulation processor receives an interrupt request originating from a first peripheral device of the plurality of peripheral devices, and in response, generates an interrupt message; and an APIC bus interface unit coupled to said local bus, said APIC bus interface unit provides an interface between the local bus and the bus to allow the interrupt message produced by the emulation processor to be sent to the at least one host processor and includes a plurality of storage elements, one of said plurality of storage elements is an identification storage element containing an identification number of the APIC unit.

7. The APIC unit according to claim 6, wherein one of said plurality of storage elements is a control/status storage element, said control/status storage element is used to control and monitor a status of said APIC bus interface unit.

8. The APIC unit according to claim 7, wherein said control/status storage element includes a first bit field to control the transmission of said interrupt message to the at least one host processor and a second bit field to control reception of an end-of-interrupt message from the at least one host processor.

9. The APIC unit according to claim 8, wherein one of said plurality of storage elements is a vector storage element to provide temporary storage of an interrupt vector of said end-of-interrupt message from the at least one host processor, said interrupt vector is used by said emulation processor to confirm that said interrupt request has been serviced.

10. The APIC unit according to claim 6, wherein one of said plurality of storage elements is an arbitration storage element containing a current arbitration priority for the APIC unit to gain ownership of the bus.

11. An advanced programmable interrupt controller (APIC) unit capable of being coupled to a bus in order to handle interrupt servicing between at least one host processor and a plurality of peripheral devices, comprising:

a local bus;

an emulation processor coupled to said local bus, said emulation processor receives an interrupt request originating from a first peripheral device of the plurality of peripheral devices, and in response, generates an interrupt message;

an APIC bus interface unit coupled to said local bus, said APIC bus interface unit provides an interface between the local bus and the bus to allow the interrupt message produced by the emulation processor to be sent to the at least one host processor; and an external interrupt storage element coupled between the plurality of peripheral devices and said emulation processor, said external interrupt storage element receives an interrupt request signal, and in response, transmits an encoded interrupt control signal as the interrupt request to said emulation processor indicating that said first peripheral device of the plurality of peripheral device requests servicing of the interrupt request.

12. An advance programmable interrupt controller (APIC) unit, capable of being coupled to a bus in order to handle interrupt operations between at least one host processor and a plurality of peripheral devices, comprising:

emulation processing means for receiving an interrupt request originating from a first peripheral device of the plurality of peripheral devices and for determining whether an interrupt message, responsive to the interrupt request, is to be sent to the at least one host processor;

interface means for providing a communication path to the bus;

bus means for coupling together said emulation processing means and said interface means; and memory means for providing storage of information used by said emulation processing means, said memory means stores a table having a plurality of bit entries, each bit entry associated with the plurality of peripheral devices capable of generating an interrupt request.

13. The APIC unit according to claim 12, wherein the interface means includes a messaging unit, said messaging unit includes at least a first storage element and a second storage element, said first storage element includes an address field indicating at least which of a plurality of bit entries is capable of providing data to or receiving data from the at least one host processor.

14. The APIC unit according to claim 13, wherein said messaging unit further includes logic circuitry to control access to said first storage element and said second storage element by the at least one host processor.

15. An advanced programmable interrupt controller (APIC) unit capable of being coupled to a bus in order to handle interrupt servicing between at least one host processor and a plurality of peripheral devices, comprising:

emulation processing means for receiving an interrupt request originating from a first peripheral device of the plurality of peripheral devices and for determining whether an interrupt message, responsive to the interrupt request, is to be sent to the at least one host processor;

interface means for providing a communication path to the bus, said interface means includes a plurality of storage elements, one of said plurality of storage elements is an identification storage element, said identification storage element contains an identification number of the APIC unit; and bus means for coupling together said emulation processing means and said interface means.

16. The APIC unit according to claim 15, wherein one of said plurality of storage elements is a control/status storage element, said control/status storage element is used to control and monitor a status of said interface means.

17. The APIC unit according to claim 16, wherein said control/status storage element includes a first bit field to control the transmission of an interrupt message to the at least one host processor and a second bit field to control reception of an end-of-interrupt message from the at least one host processor.

18. The APIC unit according to claim 17, wherein one of said plurality of storage elements means is a vector storage element which provides temporary storage of an interrupt vector of said end-of-interrupt message from the at least one host processor, said interrupt vector is used by said emulation processing means to confirm that said interrupt request has been serviced.

19. The APIC unit according to claim 15 wherein one of said plurality of storage elements means is an arbitration storage element containing a current arbitration priority for the APIC unit to gain ownership of the bus.

20. An advanced programmable interrupt controller (APIC) unit coupled to a bus in order to handle interrupt servicing between at least one host processor and a plurality of peripheral devices, comprising:

emulation processing means for receiving an interrupt request originating from a first peripheral device of the plurality of peripheral devices and for determining whether an interrupt message, responsive to the interrupt request, is to be sent to the at least one host processor;

interface means for providing a communication path to the bus, said interface means includes a plurality of storage elements, one of said plurality of storage elements is an identification storage element, said identification storage element contains an identification number of the APIC trait;

bus means for coupling together said emulation processing means and said interface means; and interrupt storage means for receiving an interrupt request signal from said first peripheral device and for transmitting an encoded interrupt control signal as the interrupt request to said emulation processing means to indicate that said first peripheral device requests service of said interrupt request, said interrupt storage means being coupled between said first peripheral device and said emulation processing means.

21. A computer system comprising:

an Advanced Programmable Interrupt Controller (APIC) bus;

at least one processor coupled to said APIC bus;

a plurality of peripheral devices, said plurality of peripheral devices includes a first peripheral device; and an APIC unit coupled to said APIC bus and said plurality of peripheral devices, said APIC unit including:
a local bus,
an emulation processor coupled to said local bus, and
an APIC bus interface unit coupled to said local bus, said APIC bus interface provides an interface between the APIC unit and said APIC bus to allow interrupt information from the emulation processor to be sent to the at least one host processor; and a memory element which contains a table having a multiple bit entry associated with each of the plurality of peripheral devices capable of generating an interrupt request.

22. The computer system according to claim 21, wherein said memory element of the APIC unit is random access memory.

23. The computer system according to claim 22, wherein said APIC unit further comprises a messaging unit coupled to said local bus, said messaging unit enables data to be read from or written into at least one entry of the memory element by a collective operation between the at least one host processor and said emulation processor.

24. The computer system according to claim 23, wherein said messaging unit of said APIC unit includes at least a first storage element and a second storage element, said first storage element includes an address field indicating at least which of a plurality of entries is capable of providing data to or receiving data from the at least one host processor.

25. The computer system according to claim 24, wherein said messaging unit of said APIC unit further includes logic circuitry to control access to said first and second storage element by the at least one host processor.

26. The computer system according to claim 21, wherein said APIC bus interface unit of said APIC unit includes a plurality of storage elements including an identification storage element which contains an identification number of the APIC unit and a control/status storage element of which its contents are used by the emulation processor to control and monitor a status of said APIC bus interface unit.

27. The computer system according to claim 26, wherein one of said plurality of storage elements is a vector storage element to provide temporary storage of an interrupt vector of an end-of-interrupt message from said at least one host processor, said interrupt vector is used by said emulation processor to confirm that said interrupt request has been serviced.

28. The computer system according to claim 21, wherein said APIC unit further comprises an external interrupt storage element coupled to said plurality of peripheral devices and said emulation processor, said external interrupt storage element receives said interrupt request and transmits an encoded interrupt control signal to said emulation processor indicating that said first peripheral device demands servicing of an interrupt request.

29. A computer system comprising:
host processor means for servicing an interrupt request;
a plurality of peripheral devices includes a first peripheral device issuing said interrupt request;
first bus means for transmitting interrupt control information including an interrupt message between said host processor means and an advanced programmable interrupt controller (APIC) means; and
said APIC means for requesting service of said interrupt request, said APIC means, being coupled to said plurality of peripheral devices, includes
emulation processing means for receiving said interrupt request originating from said first peripheral device and for servicing said interrupt request by producing an APIC interrupt message upon determining that the interrupt request should be sent to the host processor means,
interface means for providing a communication path between said APIC means and said first bus means to allow said APIC interrupt message to be sent to said host processor means,
second bus means for coupling together said emulation processing means and said interface means, and
storage means for storing an identification number of the APIC means.

30. A method for enabling a host processor to read data from an Advanced Programmable Interrupt Controller (APIC) Unit including an emulation processor and a messaging unit, the method comprising the steps of:
writing an address location of the data into a first storage element of the messaging unit;
setting an interlock to preclude the host processor from overwriting the contents of the first storage element;
interrupting the emulation processor to indicate that the first storage element contains said address location;
reading said address location by the emulation processor;
retrieving the data stored at said address location by the emulation processor;
placing the data into a second storage element by the emulation processor; and
clearing said interlock to allow the host processor to access the data stored in the second storage element.

31. A method for enabling a host processor to write data from an Advanced Programmable Interrupt Controller APIC Unit including an emulation processor and a messaging unit, the method comprising the steps of:
writing an address location of the data into a first storage element of the messaging unit by the host processor;
setting an interlock by the messaging unit in order to preclude the host processor from overwriting the contents of the first storage element;
interrupting the emulation processor to indicate that the first storage element contains said address location;
reading said address location by the emulation processor;
retrieving information stored at said address location by the emulation processor;
placing the information into a second storage element by the emulation processor;
clearing said interlock to allow the host processor to access the second storage element;
writing the data into said second storage element by the host processor;
setting said interlock to preclude the host processor from overwriting said second storage element;
reading the data by the emulation processor;
updating the contents addressed by said address location with the data; and
clearing said interlock to allow the host processor access to said first and second storage elements.

32. A method for controlling transmission and reception of messages between at least one host processor and an Advanced Programmable Interrupt Controller APIC unit including an emulation processor capable of accessing memory, the method comprising the steps of:
(1) receiving a first interrupt request from a peripheral device by the APIC unit;
(2) determining whether a second interrupt request is active, wherein if said second interrupt request is active,
  (a) selecting one of said first interrupt request and said second interrupt request to service, and
  (b) obtaining interrupt control information pertaining to the one of said first interrupt request and said second interrupt request, and alternatively
if said second interrupt request is not active,
  (a) selecting to service said first interrupt request, and
  (b) obtaining interrupt control information pertaining to said first interrupt request from the memory;
(3) using said interrupt control information to generate a first interrupt message to be transmitted from the APIC unit to the at least one host processor; and (4) awaiting an acknowledge interrupt message from the at least one host processor indicating receipt of said first interrupt message.

33. The method according to claim 32 further comprising the steps of:

receiving said acknowledge interrupt message from the at least one host processor;

determining whether said first interrupt message was accepted by the at least one host processor without an error, wherein if said error resulted, maintaining said interrupt request associated with said first interrupt message at an active state, and alternatively if said error did not occur, setting an interrupt request received bit in an entry of the memory associated with said interrupt request to indicate that said first interrupt message was accepted by the at least one host processor; and determining whether at least one interrupt request is still active, wherein if at least one interrupt request is active, selecting an active interrupt request of said at least one interrupt request to service, obtaining interrupt control information pertaining to said active interrupt request, using said interrupt control information to generate a second interrupt message to be transmitted from the APIC unit to the at least one host processor and awaiting an acknowledge interrupt message, and alternatively if at least one interrupt request is not active, enabling said interrupt requests from the plurality of peripheral devices.

34. The method according to claim 33 further comprising the steps of:

receiving an end-of-interrupt message from the at least one host processor indicating that servicing of said interrupt request has completed;

comparing an interrupt vector associated with said end-of-interrupt message with interrupt vector fields associated with each entry of a table in memory accessible to the emulation processor; and clearing all IRR and mask bits in said entries having an identical interrupt vector in said interrupt vector field.

35. An advanced programmable interrupt controller (APIC) unit handling interrupt servicing the APIC unit comprising:

a local bus;

an emulation processor coupled to the local bus, the emulation processor, including on-board memory containing a table having an entry associated with each of a plurality of peripheral devices capable of generating an interrupt request, receives the message request and produces an APIC interrupt message in response; and an APIC bus interface unit coupled to the local bus.

36. The APIC unit according to claim 35, wherein the APIC bus interface unit enables the APIC interrupt message to be sent to at least one host processor.

37. The APIC unit according to claim 36, wherein the APIC interrupt message is routed to at least one host processor through an APIC bus.

38. The APIC unit according to claim 35 further comprising a messaging unit.

39. The APIC unit according to claim 35 further comprising an external interrupt storage element coupled to the emulation processor, the external interrupt storage element receives an interrupt request from a peripheral device, and in response, produces an encoded interrupt control signal to the emulation processor.

* * * * *

UNITED STATES PATENT AND TRADEMARK OFFICE
CERTIFICATE OF CORRECTION

PATENT NO. : 5,727,217
DATED : March 10, 1998
INVENTOR(S) : Bruce Young

It is certified that error appears in the above-indentified patent and that said Letters Patent is hereby corrected as shown below:

In column 8 at line 39 delete "("LRR")" and insert --("IRR")

In column 14 at line 38 delete "trait;" and insert --unit;--

Signed and Sealed this

Eighteenth Day of August, 1998

Attest:

BRUCE LEHMAN

Attesting Officer

Commissioner of Patents and Trademarks